(12) United States Patent
Morse et al.

(10) Patent No.: US 8,557,480 B2
(45) Date of Patent: Oct. 15, 2013

(54) HIGH POWER DENSITY FUEL CELL COMPRISING AN ARRAY OF MICROCHANNELS

(75) Inventors: Jeffrey D. Morse, Northampton, MA (US); Ravindra S. Upadhye, Pleasanton, CA (US); Christopher M. Spadaccini, Oakland, CA (US); Hyung Gyu Park, Zurich (CH)

(73) Assignee: Lawrence Livermore National Security, LLC, Livermore, CA (US)

( * ) Notice: Subject to any disclaimer, the term of this patent is extended or adjusted under 35 U.S.C. 154(b) by 421 days.

(21) Appl. No.: 12/829,316

(22) Filed: Jul. 1, 2010

(65) Prior Publication Data
US 2011/0053018 A1    Mar. 3, 2011

Related U.S. Application Data

(60) Provisional application No. 61/236,943, filed on Aug. 26, 2009.

(51) Int. Cl.
| H01M 8/02 | (2006.01) |
| H01M 8/04 | (2006.01) |
| H01M 8/06 | (2006.01) |
| H01M 8/08 | (2006.01) |
| H01M 8/10 | (2006.01) |

(52) U.S. Cl.
USPC ............ 429/513; 429/423; 429/434; 429/447; 429/482; 429/500; 429/515; 429/523

(58) Field of Classification Search
USPC ......... 429/400, 303, 498, 440, 458, 423, 513, 429/434, 535, 523, 482, 447, 515, 500
See application file for complete search history.

(56) References Cited

U.S. PATENT DOCUMENTS

| 4,463,067 | A | 7/1984 | Feigenbaum |
| 5,525,436 | A | 6/1996 | Savinell et al. ................. 429/30 |
| 6,703,152 | B2 | 3/2004 | Komiya et al. ................. 429/24 |
| 6,833,204 | B2 | 12/2004 | Oyanagi et al. ................. 429/13 |
| 6,960,235 | B2 | 11/2005 | Morse et al. ................. 48/127.9 |
| 7,029,781 | B2 | 4/2006 | Lo Priore et al. ................. 429/32 |
| 2001/0049042 | A1 | 12/2001 | Okamoto et al. |
| 2002/0012822 | A1 | 1/2002 | Oyanagi et al. ................. 429/13 |
| 2002/0012823 | A1 | 1/2002 | Komiya et al. ................. 429/13 |
| 2002/0177032 | A1 | 11/2002 | Suenaga et al. |
| 2003/0027022 | A1* | 2/2003 | Arana et al. ................. 429/17 |
| 2003/0039874 | A1 | 2/2003 | Jankowski et al. |

(Continued)

OTHER PUBLICATIONS

U.S. Appl. No. 12/829,331, filed Jul. 1, 2010.

(Continued)

*Primary Examiner* — Kenneth Douyette
(74) *Attorney, Agent, or Firm* — Dominic M. Kotab

(57) ABSTRACT

A fuel cell according to one embodiment includes a porous electrolyte support structure defining an array of microchannels, the microchannels including fuel and oxidant microchannels; fuel electrodes formed along some of the microchannels; and oxidant electrodes formed along other of the microchannels. A method of making a fuel cell according to one embodiment includes forming an array of walls defining microchannels therebetween using at least one of molding, stamping, extrusion, injection and electrodeposition; processing the walls to make the walls porous, thereby creating a porous electrolyte support structure; forming anode electrodes along some of the microchannels; and forming cathode electrodes along other of the microchannels. Additional embodiments are also disclosed.

48 Claims, 5 Drawing Sheets

(56) References Cited

U.S. PATENT DOCUMENTS

| | | | |
|---|---|---|---|
| 2004/0009377 A1 | 1/2004 | Iguchi et al. | 429/13 |
| 2004/0023101 A1* | 2/2004 | Jacobson et al. | 429/38 |
| 2004/0072039 A1 | 4/2004 | Jankowski et al. | 429/19 |
| 2004/0142214 A1* | 7/2004 | Priore et al. | 429/12 |
| 2005/0260485 A1 | 11/2005 | Sopchak et al. | 429/46 |
| 2006/0003217 A1* | 1/2006 | Cohen et al. | 429/34 |
| 2006/0251969 A1* | 11/2006 | Maier et al. | 429/303 |
| 2007/0054171 A1* | 3/2007 | Laurent et al. | 429/34 |

OTHER PUBLICATIONS

Restriction/Election Requirement from U.S. Appl. No. 12/829,331 dated Oct. 1, 2012.

Non-Final Office Action from U.S. Appl. No. 12/829,331 dated Nov. 8, 2012.

D'Arrigo et al., "Minaturized Proton Exchange Fuel Cell in Micromachined Silicon Surface," Proc. of SPIE, vol. 5344, Jan. 24, 2004, pp. 163-174.

* cited by examiner

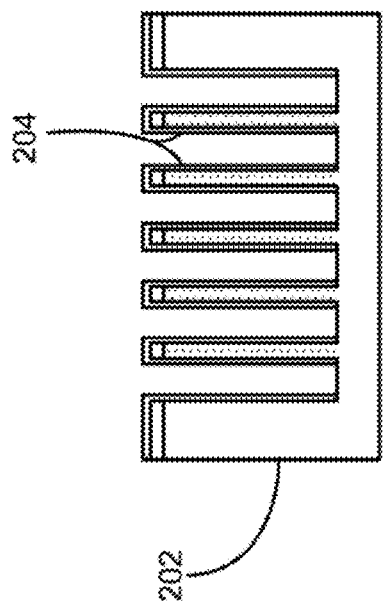
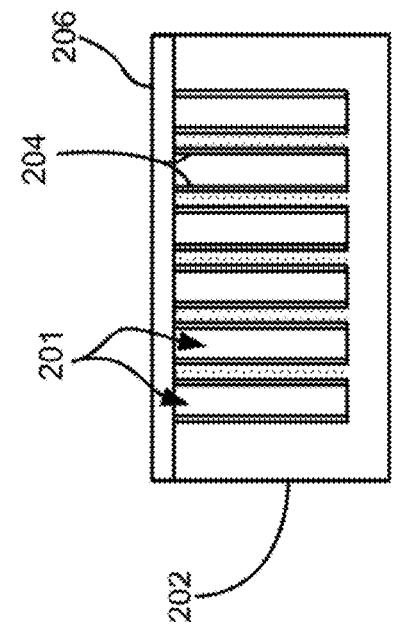
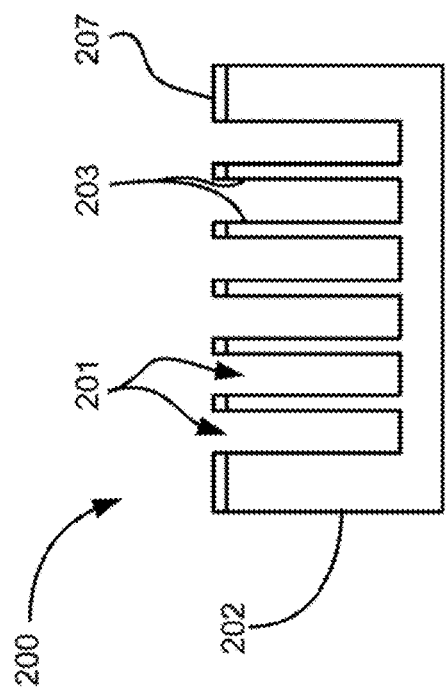

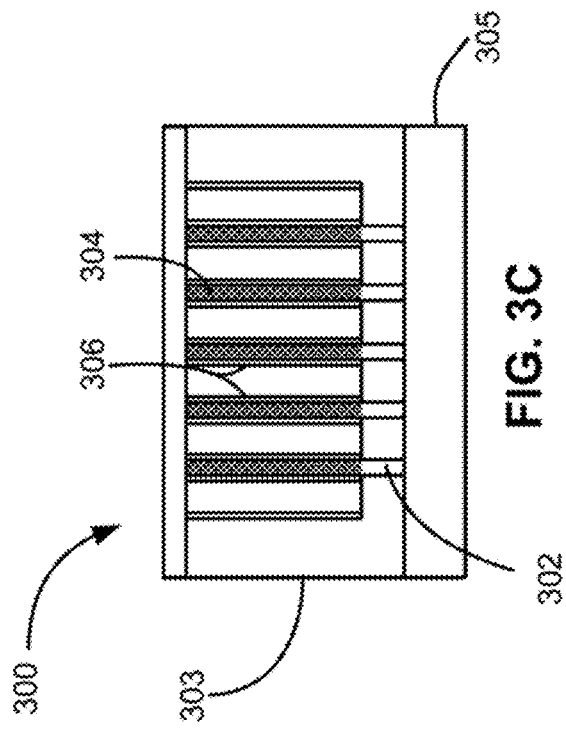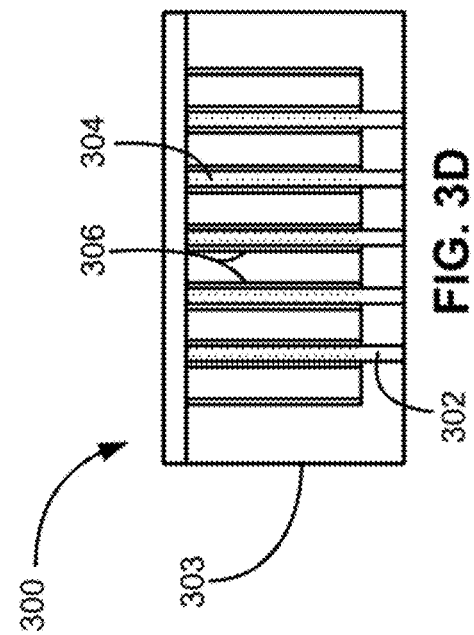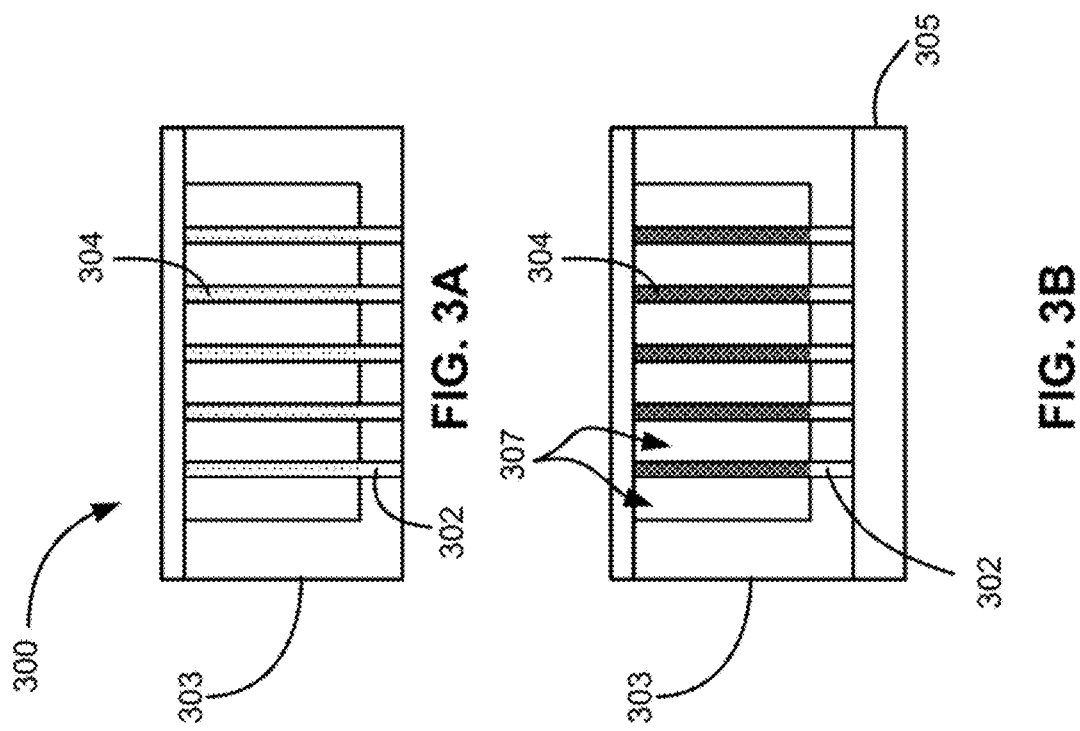

HIGH POWER DENSITY FUEL CELL COMPRISING AN ARRAY OF MICROCHANNELS

RELATED APPLICATIONS

This application claims priority to provisional U.S. Patent Application No. 61/236,943 filed on Aug. 26, 2009, and which is herein incorporated by reference.

This application is related to U.S. patent application Ser. No. 12/829,331 to Sopchak et al., filed concurrently herewith and having the title "High Power Density Fuel Cell," and which is incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to fuel cells, and particularly, to high density fuel cells.

BACKGROUND

There are several types of fuel cells currently available, all with specific advantages and disadvantages. Currently, work has been intensifying in the area of methanol reformers, devices that can convert methanol and water into hydrogen and carbon dioxide. The hydrogen from such a device can be used to run a fuel cell. Typically, these reformers operate at 200-300° C., and produce several tenths of a percent carbon monoxide in their effluent stream. Proton exchange membrane (PEM) fuel cells typically operate at <85° C. At these temperatures, more than 100 ppm carbon monoxide in the fuel stream is typically poisonous to the anode catalyst of a fuel cell. In order to alleviate this condition, a preferential oxidizer, or PROX, is used to selectively oxidize carbon monoxide in the fuel stream to carbon dioxide, while leaving most of the hydrogen unreacted, before it reaches the fuel cell. The preferential oxidizer lowers the carbon monoxide levels to less than 100 ppm, yet this is still enough to poison the anode of the low temperature PEM fuel cell.

A fuel cell that operates at 80° C., while intrinsically a fairly efficient device, nonetheless liberates about 50% of the energy in the fuel stream as heat. At such temperatures, this waste heat is of low quality and cannot be used to drive the reforming reaction, which is endothermic. Typical proton exchange membranes, such as Nafion, also require aggressive humidification for optimal ionic conductivity and peak performance. Supplying the fuel cell with both fuel and oxidant gas streams at near saturated levels increases system complexity. Also; a fuel cell is a device that creates water as product, while typically necessitating a tight operating window where conditions must be delicately balanced between saturation for optimum performance, while avoiding condensing conditions, which chokes off gas access to the electrodes and degrades performance.

Thus, a nominal fuel cell is preferably ideally suited, both thermally and chemically, for operation in conjunction with a methanol or other hydrocarbon fuel reformer. Phosphoric acid fuel cells (PAFCs) are well suited for these conditions, as they can operate at higher temperatures.

SUMMARY

A fuel cell according to one embodiment includes a porous electrolyte support structure defining an array of microchannels, the microchannels including fuel and oxidant microchannels; fuel electrodes formed along some of the microchannels; and oxidant electrodes formed along other of the microchannels.

A system according to one embodiment may include a fuel cell as recited above, and further comprising a component coupled to the fuel cell, such as a heat exchanger, a microchannel fuel processor, and a heater.

A system according to one embodiment may include a fuel cell as recited above and further including a component coupled to the fuel cell, such as a micro-pump, a micro valves, a flow controller, a thermal feedback controller, a rechargeable battery, an ultracapacitor, a fuel tank, an oxidant blower, and a fuel storage cartridge.

A method of making a fuel cell according to one embodiment includes forming an array of walls defining microchannels therebetween using at least one of molding, stamping, extrusion, injection and electrodeposition; processing the walls to make the walls porous, thereby creating a porous electrolyte support structure; forming anode electrodes along some of the microchannels; and forming cathode electrodes along other of the microchannels.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 2A-2D are cross sectional views of a process for fabricating a fuel cell according to one embodiment.

FIGS. 3A-3D are cross sectional views of fuel cells according to various embodiments.

DETAILED DESCRIPTION

Figure 1:
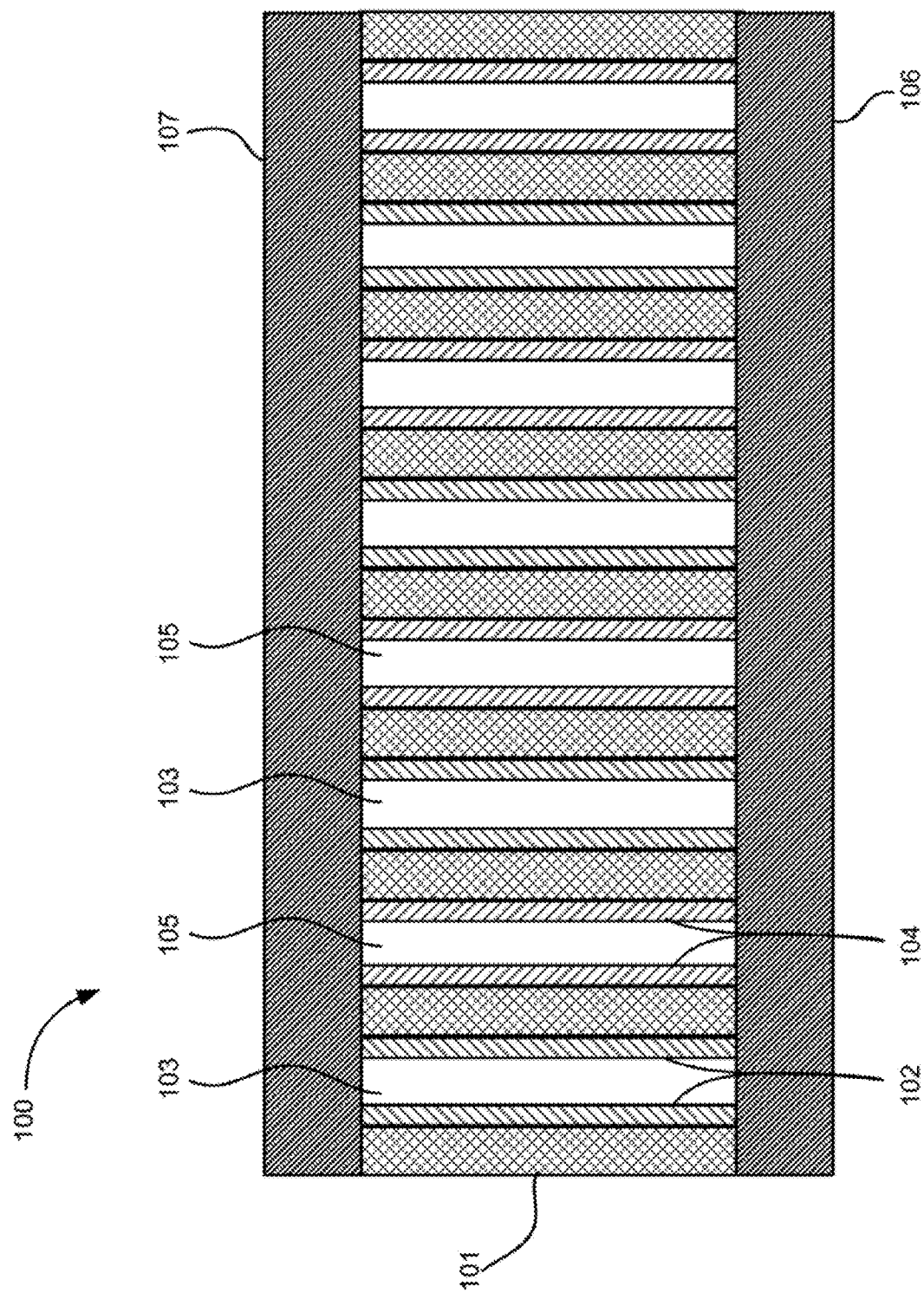
FIG. 1 is a cross sectional view of a fuel cell according to one embodiment.

The following description is made for the purpose of illustrating the general principles of the present invention and is not meant to limit the inventive concepts claimed herein. Further, particular features described herein, including any incorporated description, can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value unless otherwise specified. For example, a temperature of about 50° C. refers to a temperature of 50° C.±5° C., etc.

Various embodiments of the present invention described herein include a high power density fuel cell which may be comprised of less individual parts than conventional fuel cells, and may have other advantageous properties as well. The description herein provides an illustrative and nonlimiting basis for forming the electrodes, electrolyte membrane, and associated anode and cathode flow fields in an integrated platform. Furthermore, the three-dimensional microfluidic flow field architecture of some embodiments, along with porous electrolyte support structures, offers significant advantages to increase the volumetric power density of the fuel cell, as well as allows manufacture of fuel cells via a continuous integration approach.

In one general approach, a fuel cell includes a porous electrolyte support structure defining an array of microchannels, the microchannels including fuel and oxidant microchannels; fuel electrodes formed along some of the microchannels; and oxidant electrodes formed along other of the microchannels.

In one general approach, a method of making a fuel cell includes forming an array of walls defining microchannels therebetween using at least one of molding, stamping, extrusion, injection and electrodeposition; processing the walls to make the walls porous, thereby creating a porous electrolyte support structure; forming anode electrodes along some of the microchannels; and forming cathode electrodes along other of the microchannels.

Prior art fuel cells such as phosphoric acid fuel cells (PAFCs) are comprised of several parts. At the center is a porous matrix which holds the phosphoric acid electrolyte. This is typically made of a sintered Teflon™/silicon carbide matrix tens of microns thick. The Teflon™/silicon carbide matrix is situated between two pieces of porous carbon fiber sheets, or gas diffusion layers (GDLs), which have had carbon supported platinum electrodes sprayed or screened onto one side. The electrodes and their supporting GDLs also contain a Teflon™ matrix created by the incorporation of Teflon™ particles into the GDLs during fabrication and subsequent sintering. This Teflon™ matrix maintains gas access to the catalyst sites by preventing the electrodes and GDLs from being completely flooded with phosphoric acid. The phosphoric acid electrolyte is added to the edge of the sintered lilt and is wicked in by capillary action to form a membrane-electrode-assembly. This membrane-electrode-assembly (MEA) is then fitted between two flow fields with a sealing gasket around the edge. The flow fields are typically machined out of graphite because graphite has good corrosion resistance and electrical conductivity. In many cases flow fields are machined into both sides of a graphite plate, resulting in a bipolar plate. Electrolyte reservoirs may also be machined into the graphite plate. This technique results in about 5 to 7 pieces required per cell: one bipolar plate, one gasket, one electrolyte matrix, two GDL/electrode layers.

Fuel cells according to various embodiments comprise less individual parts than conventional fuel cells. The fuel cells disclosed herein have other advantageous properties than conventional fuel cells, such as very high surface area, very thin membranes, and very thin membrane electrode assemblies.

Moreover, fuel cells according to some embodiments allow high temperature operation. PAFC embodiments are generally suited, both thermally and chemically, for operation in conjunction with a methanol reformer. PAFCs can operate from 150° to 250° C. Above 150° C., the kinetics of carbon monoxide turnover on the fuel cell electrode become favorable, and the presence of one percent carbon monoxide in the fuel stream does not significantly degrade performance. Furthermore, PAFCs do not require humidification of their gas streams for good performance, eliminating the necessity for a tight operating window.

While the tolerance to carbon monoxide renders PAFCs according to several embodiments chemically compatible with reformed hydrocarbon fuels, thermally some embodiments operate best in the 150-200° C. range, in some approaches extending up to 250° C. and higher. Typical hydrocarbon reforming reactions function best in the >250° C. regime; nominally the higher the temperature, the faster the reactions are. As an example, a methanol steam reformer operating at 300-400° C. is very efficient with high reaction rates, but produces a significant amount of carbon monoxide, possibly in excess of several percent. Alternative hydrocarbon fuels include, but are not limited to, ethanol, methane, propane, butane, propanol, dimethyl ether (DME), etc. The conversion process for most of these fuel choices occurs at much higher temperatures (400-700° C.), and produces similar high levels of carbon monoxide on the order of >1 percent, which would be sufficient to poison the anode catalyst of low temperature fuel cells. To further enhance the chemical and thermal integration of a microscale fuel cell with fuel processors, electrolytes operating at higher temperatures compatible with the fuel reforming temperatures may be used in various embodiments. Any such electrolyte may be used. Examples of such electrolytes include solid oxide, diamond, phosphoric acid doped polybenzamidizole, and other composites electrolytes, such as $NH_4PO_3/TiP_2O_7$ for example, or others including $NH_4PO_3/(NH_4)_2TiP_4O_{13}$, and $(NH_4)_2SiP_4O_{13}$.

Further embodiments of the present invention include micro channel fuel cell embodiments that provide increased surface area, hence higher power density per unit volume, while reducing the size of the fuel cell, and are further manufacturable and cost competitive. Such embodiments may incorporate features presented above. Particularly preferred embodiments are presented below.

In some approaches, the fuel cells have or are used in conjunction with electrolytes with high (e.g., >400° C. such as 400-700° C. or higher) and/or intermediate (e.g., >250-400° C., 350-400° C., etc.) temperature of operation, with various materials that can be contained in a microporous or nanoporous support structure. Yet other embodiments include high power density, intermediate to high temperature fuel cells that can as an option be monolithically and thermally integrated with 1.) a catalytic micro channel combustor (an exothermic device) for rapid heat up and thermal control; 2.) an evaporator/heat exchanger for recuperating thermal losses in the exhaust gases and preheating the incoming fuel/air streams, and/or 3.) a micro channel, catalytic fuel reformer to convert a hydrocarbon or other fuel stream into a hydrogen rich fuel feed to the fuel cell anode.

In some approaches, direct reforming at the fuel cell anode may be possible for certain hydrocarbon fuels whereby reforming catalysts such as platinum, carbon, copper, zinc, alumina, or other catalysts sufficient to convert the specific hydrocarbon fuel to a hydrogen rich feed are coated inside the micro flow channel leading to the fuel cell anode.

In further approaches, the fuel cells provide a reliable, high power density, manufacturable micro-fuel cell that operates at low temperatures with hydrogen or direct methanol as the fuel feed.

In each of these embodiments, catalysts optimal and specific to the type of fuel used may be coated on the anode side of the fuel cell. Such catalyst compositions are routinely reported in the literature and would be apparent to those skilled in the art.

Referring now to FIG. 1, an embodiment of a fuel cell, which may be a PAFC or other type of fuel cell, is illustrated. The fuel cell is identified generally by the reference numeral 100.

The fuel cell 100 shown in FIG. 1 includes the following structural components: porous electrolyte support structure 101 (also referred to herein as a porous support structure), fuel electrodes 102; fuel microchannels 103 containing or for receiving fuel; oxidant electrodes 104; oxidant microchannels 105 containing or for receiving an oxidant such as air, oxygen and/or an oxygen-containing gas or liquid; bottom support 106; and upper support 107. The fuel microchannels 103 for fuel and the oxidant microchannels 105 for oxidant are positioned between the bottom support 106 and the upper support 107, preferably in alternating fashion. The fuel cell 100 may be produced utilizing various methods of manufacture, including but not limited to MicroElectroMechanical Systems (MEMS) technology, semiconductor fabrication technology, etc. and combinations thereof.

With continued reference to the cross sectional view of the fuel cell 100 of FIG. 1, the embodiment shown includes features a plurality of micro flow channels 103, 105, with alternating flow channels carrying either fuel or oxidant in the same direction, or in a counter flow direction as a possible mechanism for carrying off excess heat. The corresponding wall between each fuel and oxidant microchannel is a porous support structure filled with an electrolyte, and each surface of the porous support structure is coated with an electrode and catalyst composition suitable for the oxidation reaction in the oxidant microchannel, and the fuel conversion or reduction reaction in the fuel micro channel.

The porous support structure may be filled with electrolyte by employing liquid precursors or a liquid electrolyte that can be, e.g., wicked into the pores. Moreover, surface properties of the pores may be tailored such that wetting of the porous support material 101 by the electrolyte is preferred. In this manner, virtually any electrolyte composition that can be synthesized by first starting with liquid precursors can be used, opening up the possibility of a range of temperatures or operation, and controlling both chemical and mechanical stability.

Effectively, each porous support structure 101 with anode and cathode electrodes 102, 104 forms an individual fuel cell element, and the entire array or plurality essentially form a fuel cell "stack". Electrical leads (not shown) attached to the individual electrodes of each cell can be bussed together in any format to scale the voltage or current as needed for the final power output design requirements. Other features of the three dimensional high power density fuel cell embodiment 100 are that the porous support structure 101, in this case a ridge or wall with microchannels 103, 105 on either side, and subsequent array of porous support structures and microchannels to form a plurality of fuel cells may be formed from the same substrate material by first etching or patterning to create the micro channels, then making the ridge structure between micro channels porous via anodic, electrochemical, or other etch processes, chemical or ion exchange. Additionally, the porous support structures and surrounding micro channel arrays can be funned through a molding or stamping process, extrusion, injection, or electrodeposition of a given material in a preform to define the specific features and dimensions of the microchannel and porous support structure. As such, the porous support structure may be made of silicon, glass, ceramic, alumina, polymer, plastic, epoxy resin, or metal oxide materials with the provision of being nonelectrically conductive, as well as stable for the specific electrolyte material from a chemical, thermal, and surface wetting standpoint.

The fuel cell 100 in one embodiment may be implemented as a microchannel fuel cell having a microchannel array etched in a substrate, e.g., comprising silicon, a metal such as aluminum, glass, polymer, ceramic, plastic, epoxy resin, a metal oxide materials such as alumina, etc. preferably with the provision of being nonelectrically conductive, as well as stable for the specific electrolyte material from a chemical, thermal, and surface wetting standpoint, etc. The microchannels may have depths from less than one millimeter up to several millimeters and widths ranging from about 10-1000 μm, or more or less. The remaining walls may be about 1-500 μm wide, or more or less, preferably about 5-50 μm. The microchannels and/or walls defining them may be elongated and have longitudinal axes that are substantially parallel. In preferred embodiments, each wall separates an oxidant microchannel and a fuel microchannel.

Once the channels are etched, the walls are made porous in one approach by an anodizing or electrochemical etch, chemical and/or ion exchange, or other techniques used to make materials porous. As an option, the surfaces of the pores can be functionalized by known chemical processes in order to selectively wet the electrolyte. In another approach, electrically controlled surface wetting may be employed to help the electrolyte to wick into the pore structures.

The bottom support layer 106 and the upper support layer 107 may be porous, but are preferably primarily non-porous. The sidewalls are coated with electrodes. The electrode is not continuous over the top surface. This may be accomplished by using photolithographic techniques or a "lift off" approach. As an option, reforming catalysts such as platinum, carbon, copper, zinc, alumina, or other catalysts sufficient to convert the specific hydrocarbon fuel to be used with the fuel cell to a hydrogen rich feed may be provided, e.g., coated, inside the micro flow channel leading to the fuel cell anode, and may or may not form part of or be integrated with, the electrode. The porous support structure (walls) is filled with a phosphoric acid electrolyte. A non-porous cap layer (e.g., the upper support layer 107) is bonded to the top surface to form a continuous, sealed microchannel array. If oxidant and fuel flow in adjacent and alternating microchannels, each separating wall represents a fuel cell, with the entire array representing a fuel cell stack. Electrical connections to alternating electrodes can be made at the ends of the channels, and bussed accordingly for optimal power output.

The effective catalyst/electrode surface area can be substantially increased by (1) the addition of a platinum (or other metallic) nanoparticles supported on carbon black powder and/or (2) the introduction of carbon nanostructures such as nanotubes, nanorods, nanoparticles, nanocomposites, etc. into and/or around the pores on the flow field/conductive side of the wafer prior to charging with phosphoric acid. In addition to carbon black powder, platinum on other conductive supports of high surface area to volume ratio also function well in this regard. Other high surface area, porous electrode materials and compositions may be used, including the range of materials known to those familiar in the art. A Teflon™-containing emulsion can be added to the carbon/catalyst mixture and sintered to limit the intrusion of phosphoric acid into the catalyst layer. The Teflon™-containing emulsion is also expected to create a more favorable electrolyte/gas interface at the Catalyst sites. The use of hydrophobic/hydrophilic mixtures of carbon particles may also provide a similar, useful partition of the gas and electrolyte domains, leading to improved performance.

It is to be noted that, with the exception of the optional Teflon™ treatment mentioned above, some configurations of the fuel cells described herein contain no polymeric materials, and thus would be extremely radiation resistant. While other fuel cell types, such as molten carbonate or solid oxide fuel cells also contain no polymeric materials, they are rarely capable of operating at temperature ranges below 500° C. Thus, one of the advantages of some of the fuel cell embodiments disclosed herein is that they are capable of operation in high radiation environments at convenient operating temperatures for methanol reforming. The operating temperature is not a prohibitively high temperature where thermal management and heat loss becomes detrimental for small (<100 W) fuel cell configurations.

While further aspects of the three dimensional high power density fuel cell are described in the referenced copending patent application filed concurrently herewith, embodiments presented herein further specify materials and embodiments of the fuel cell architecture, provide embodiments that will lead to improved performance and manufacturability, and address aspects of integration of such a device with other components that make up a complete micro-fuel cell power source.

Moreover, some embodiments use a new fuel cell membrane electrode assembly that can be scaled up in size for higher power density for applications such as automotive or stationary fuel cell power generation applications. An additional advantage and feature of such embodiments is that the fuel cell "stack" can be manufactured, in one approach, via a continuous process step exploiting MEMS or other microfabrication techniques, while further reducing component count of the system or device. This leads to reduced cost and higher reliability.

A further advantage provided by some embodiments is the high surface areas of the channel sidewalls that form the membrane between reactant flow paths offers a mechanism for counterflow heat exchange to maintain a cool temperature for the membrane sidewall and fuel cell structure. In this manner cool reactant gases flowing into opposite ends of the channel extract heat from the channel sidewall, which is the fuel cell membrane, thereby enabling cooling of the structure.

A process for forming a high power density, three dimensional microchannel fuel cell 200 is illustrated in FIGS. 2A-2D. This approach enables fuel cells to be integrated at the micro scale, enabling most or all components to be formed through a continuous integration process, while realizing the benefit of substantially increased surface area of the electrode, effective membrane, and ultimately the triple point interface between the electrolyte, electrode, and catalyst, all of which contribute to increased power density for the fuel cell. Referring to FIG. 2A, etching or other subtractive process is used to form a horizontal array of microchannels 201 in a substrate 202. The etching may include deep reactive ion etching, chemical etching, etc. Subtractive processes may include milling, ablation, etc. In one specific example, deep reactive ion etching may be used to form microchannels in a silicon wafer. As shown in FIG. 2A, in one approach, only a portion of the thickness of the substrate 202 may be etched or removed, such that the substrate material forms the walls 203 and defines the bottoms of the microchannels 201. A mask 207, e.g., of photoresist, may be used to define the walls 203 separating the channels.

Illustrative depths of the channels in some embodiments may be about 0.1 mm to about 1.0 mm or higher or lower, with widths between opposing sidewalls thereof of about 10-500 µm (e.g., a 20:1 aspect ratio), or higher or lower. The length of the microchannels can be as long as desired, with a preferred range of channel lengths for increased power density on the order of about 1-10 mm, but could also be formed over significantly larger lengths and areas. The microchannels provide the flow paths for fuel and oxidant interfaced to an outside source. The unetched walls remaining may range from about 3 µm to >50 µm wide (between channels), and possibly even thinner as etch processes improve.

Referring to FIG. 2B, the walls 203 are made porous, e.g., using an electrochemical processes, an anodization process, etc. to create a porous electrolyte support structure. Continuing with the silicon wafer example, the walls are converted into porous silicon. Once the walls are made porous, a thermal oxidation step may be used to passivate the porous silicon walls, which will now act as the electrolyte membranes (porous electrolyte support structure) for the fuel cell. The electrolyte may be added to the porous electrolyte support structure at this point, or later in processing.

Referring to FIG. 2C, catalyst and electrode layers 204 are coated into the microchannels. The catalyst and electrode layers 204 may be individually-formed layers and/or an integrated or composite layer. Methods to achieve this include sputtering, CVD, electrodeposition, atomic layer epitaxy, washcoat/solution processing, etc. A preferred catalyst is platinum, for example, though other known catalysts may be used. The electrode materials may be carbon, or other metals and/or conductors that can be coated to form a porous, electrically conductive film over the porous electrolyte support structure. Other choices for electrodes and catalysts may include compositions of nanocomposites wherein carbon nanostructures such as nanotubes, nanoparticles, nanorods, or other structures are decorated with platinum or other catalysts via various processes reported in the literature, then coated on the surface by a washcoat, spin-casting, flow casting type, or other suitable process.

As shown in FIG. 2D, any materials on the top surface of the structure can be removed via liftoff, polishing, etc. A capping layer 206 is coupled to the top surface of the structure e.g., via bonding, adhesive, thermal treatment, etc. Electrical connections are added. Fuel and oxidant connections may be made as well.

While a process compatible with MEMS approaches utilizing porous silicon for the electrolyte support has been described, similar structures can be formed using a range of materials and processes. For example, materials suitable for forming the porous support structure (e.g., base layer and walls) include polymers, plastic, glass, ceramics, alumina, and metal oxides. The microchannels and wall separators can be formed by etching, electro forming, molding, stamping, extrusion, injection, electroplating, deposition, or a variety of additive/subtractive processes combined in order to create a structure substantially perpendicular to the substrate it is formed on or from. Methods for making the material porous include sintering, anodic or chemical etching, selective chemical etch or exchange of a nanocomponent (e.g., nanostructure) within the material, phase segregation in polymers and plastics, and other techniques known to those familiar with the field. In any case it is desirable to achieve micro channels on a dense substrate or support structure, with the microchannels separated by a wall-like porous support structure. Ideally the porous support structure is high aspect ratio, ranges in height from about 1 µm to several millimeters, having a width or thickness ranging from about 1 µm to about 100 µm depending on stability.

Examples of processes and materials beyond the porous silicon embodiment described include etching or micro machining channels in aluminum, then anodic etching of the aluminum walls to form porous alumina. The surface of pores can be functionalized by chemical processes in order to selectively wet the electrolyte, or possibly employ some electrically controlled surface wetting to help the electrolyte to wick into the pore structures.

In another illustrative embodiment, a polymer material solution is mixed with carbon nanostructures such as nanotubes, nanorods, nanoparticles, nanocomposites, etc. which are then molded onto a substrate and cured to form micro channels and separating walls. The polymer walls can be made porous by selective removal of some or all of the carbon nanostructures in the polymer matrix, e.g., by oxidation or chemical etching, after which the electrolyte is wicked into the porous polymer electrolyte support structure. The resulting pores are characterized as having shapes of the previously-present nanostructures.

In another approach, a block copolymer material composition may be used which can be Molded or spin cast and etched to form the microchannels. The block copolymer walls then phase segregate to form ordered porosity within the structure. By controlling the polymer mixture and composition, and subsequent process steps, continuous porosity through the wall structure is achieved.

Other known methods may be used to form high aspect ratio porous support structures in some approaches, as will be known to those skilled in the art. Whichever method is ultimately selected, it is desirable to form high aspect ratio three dimensional structures through compatible processes and materials such that mechanical and chemical stability is achieved for the particular embodiment.

Returning to the MEMS approach, which could also be applied to any of the alternative examples presented, for the microchannel array, adjacent channels may alternate the flow of fuel or oxidant, such that each porous wall/membrane and overlayers now represents a fuel cell element. While some embodiments may have the same cathode and anode catalyst loading and materials, if different requirements are necessary, provisions in the process may be made to coat the anode channels separately from the cathode channels. A masking process may be employed for coating each channel; a solution/washcoat process that could be used to coat the anode/cathode microchannels separately either before or after the capping layer is added to the microchannels; etc. Finally, the fuel cell is formed by liftoff of the catalyst/electrode coatings porous silicon mask layer, thereby separating the electrodes for the anode/cathode. If not previously performed, electrolyte is added to the porous support structure. The porous support structure and embodiment is versatile for a range of electrolyte materials, thereby offering the ability to vary operating temperature, ionic conductivity, and other attributes.

In some embodiments, the porous material surface can be controlled so as to wet the electrolyte solution, with surface tension forces retaining the electrolyte within the structure. Depending on the liquid precursors and electrolyte materials, thermal or photo curing steps can be used to cross-link and stabilize the electrolyte composition, and further bind it to the porous support material. If the electrolyte is liquid in operation, such as phosphoric acid, then no further steps may be required other than ensuring the electrolyte does not wet the electrode and catalyst materials. This has been demonstrated by the inventors for the case of phosphoric acid in porous silicon, but critical attention should be paid to the properties of the catalyst and electrode materials such that the electrolyte does not wet to these layers.

In the various embodiments of the present invention, additional electrolyte options for proton conductive membrane fuel cells (PEMFCs) may incorporate easily processable, about 100% curable, low molecular weight reactive liquid precursors to form solid compositions within the porous support structure. An example is highly fluorinated liquid precursors based on styrenically functionalized reactive perfluoropolyethers (PFPEs) that may be used in conjunction with a fluorinated derivative of sulfonated styrenic (SS) monomers. These fluorinated species can mix to form a single phase condensed liquid that can be fully cured into cross-linked membranes with very high acid levels. In order to successfully synthesize such new materials, it may be necessary to copolymerize fluorinated derivates of the SS monomers with the functional PFPEs as opposed to using the acid form of the styrenic monomer directly; otherwise single phase mixtures may not be achievable.

Other choices of electrolyte to further enhance the chemical and thermal integration of a micro scale fuel cell with fuel processors may be employed. For example, electrolytes operating at higher temperatures compatible with the fuel reforming temperatures are desired. Examples of these that are familiar to experts and non-experts in the field and include solid oxide, diamond, phosphoric acid doped polybenzamidizole, and other composites electrolytes, such as $NH_4PO_3/TiP_2O_7$ for example, or others including $NH_4PO_3/(NH_4)_2TiP_4O_{13}$, and $(NH_4)_2SiP_4O_{13}$.

Some embodiments may further exploit an advanced nanoscale catalyst method compatible with a three dimensional fuel cell architecture. This may include atomic layer deposition techniques, along with solgel/washcoat methods to disperse nanoscale catalyst in the surface region of the nanoporous support matrix, and electrochemical deposition.

A process for forming a fuel cell 300 is shown in FIGS. 3A-3C. Referring to FIG. 3A, gaps 302 are etched through the base 303, possibly using deep reactive ion etching or other etch techniques, milling, etc., to provide access to the porous support structures 304. Each gap provides a conduit through which the electrolyte could be more easily injected or wicked from an electrolyte reservoir 305, which may be in part formed from the base 303, and/or coupled thereto. See FIG. 3B. This step may be preceded or followed by capping of the microchannel array, e.g., by wafer bonding techniques. Electrodes 306 may be added to the walls of the porous support structures 304 using solgel/washcoat methods, electrochemical deposition, etc. via the opens ends of the channels 307 at some point during assembly, such as after the electrolyte is added to the porous support structures. See FIG. 3C

In an alternate approach, shown in FIG. 3D, the electrodes 306 are formed, then the gaps 302 are etched and electrolyte added to the porous support structure 304. These embodiments may also allow replenishment of the electrolyte if it becomes depleted over time.

The microchannels may be manifolded independently for fuel and oxidant flow, and the electrodes for anode/cathode are bussed out of each end. Assuming alternating oxidant and fuel microchannels, each wall between channels now represents a fuel cell, and the electrodes can be bussed in parallel or series to scale up voltage output on-chip.

Figure 4:
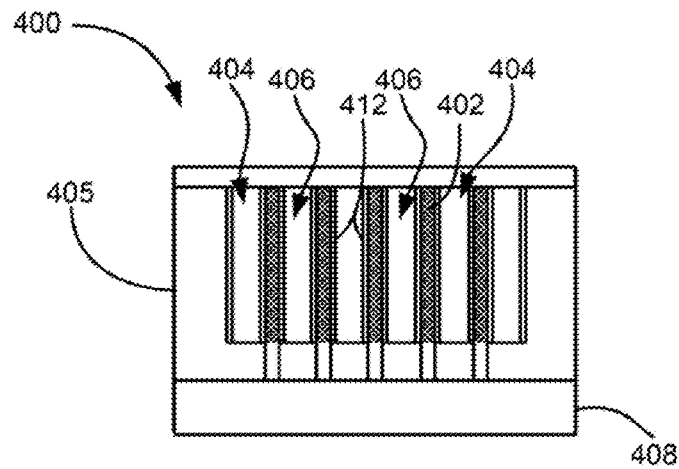
FIG. 4 is a cross sectional view of a fuel cell and electrolyte reservoir according to one embodiment.

FIG. 4 illustrates a fuel cell 400 in which the porous support structure 402 between the oxidant and fuel microchannels 404, 406 is extended through the base 405 to interface a reservoir 408 of liquid electrolyte in order to provide electrolyte as it becomes depleted over time from the porous support structure. This techniques may also or alternatively be used for filling the porous support structure with liquid electrolyte precursors which are then cured by photo exposure, thermal cycling or other polymerization methods. Also shown are the electrodes 412.

Figure 5:
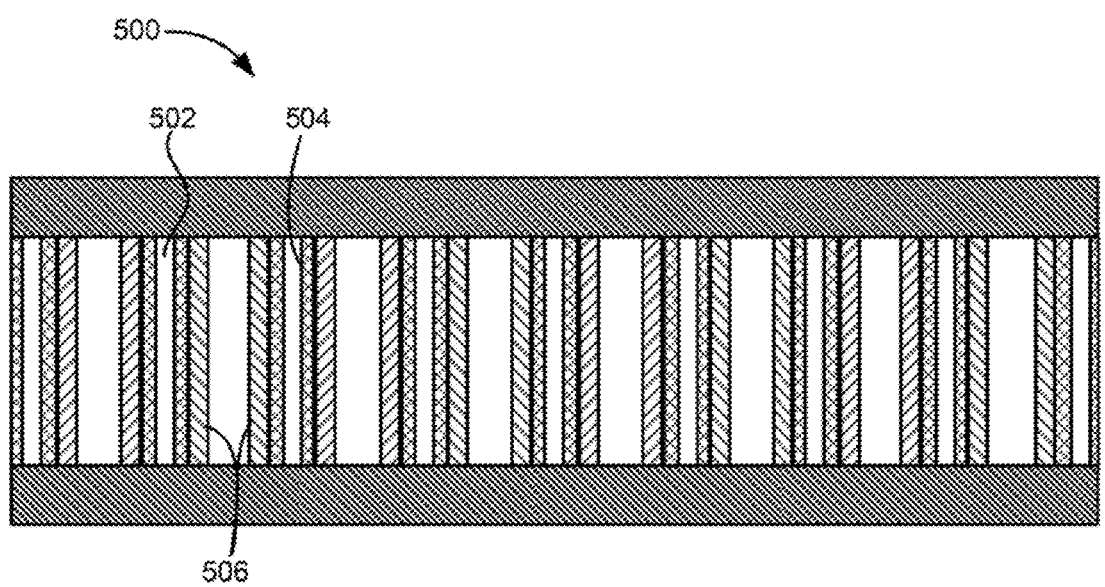
FIG. 5 is a cross sectional view of a fuel cell according to one embodiment.

FIG. 5 illustrates a fuel cell 500 with gaps 502 formed inside the walls of the porous support structure 504, preferably towards the middles thereof, but the gaps 502 can be positioned anywhere between the sidewalls of the porous support structure. Electrodes 506 are formed along the microchannels. The gaps 502 may be placed in communication with an electrolyte reservoir (not shown), thereby allowing wicking or pressure forces to encourage the electrolyte to fill the porous support structure either from the end of the gaps or some orifice formed at any position along the porous support structure interfacing the electrolyte reservoir.

Figure 6:
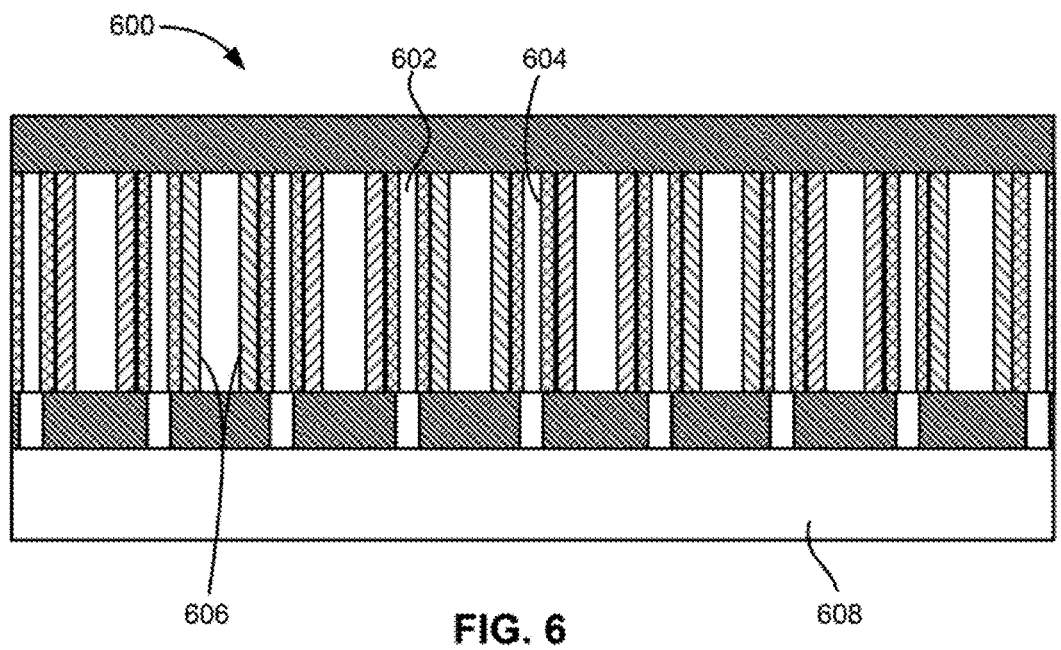
FIG. 6 is a cross sectional view of a fuel cell according to one embodiment.

FIG. 6 illustrates a fuel cell 600 with internal gaps 602 formed inside the porous support structures 604 with electrodes 606 formed thereon. The gaps 602 are in communication with an electrolyte reservoir 608, thereby allowing wicking or pressure forces to encourage the electrolyte to fill the porous support structure either from the end of the gaps or some orifice formed at any position along the porous support structure interfacing the electrolyte reservoir.

Again, the embodiments of FIGS. 4-6 are functional both in operation using liquid electrolytes, or in manufacture as an optional mechanism to fill the porous support structure with electrolyte and/or electrolyte precursors. In other approaches, it may be sufficient to simply dip the porous support structure in the liquid electrolyte after chemically treating it to render the pore surface structure electrolyte-phylic to the specific electrolyte utilized.

Figure 7:
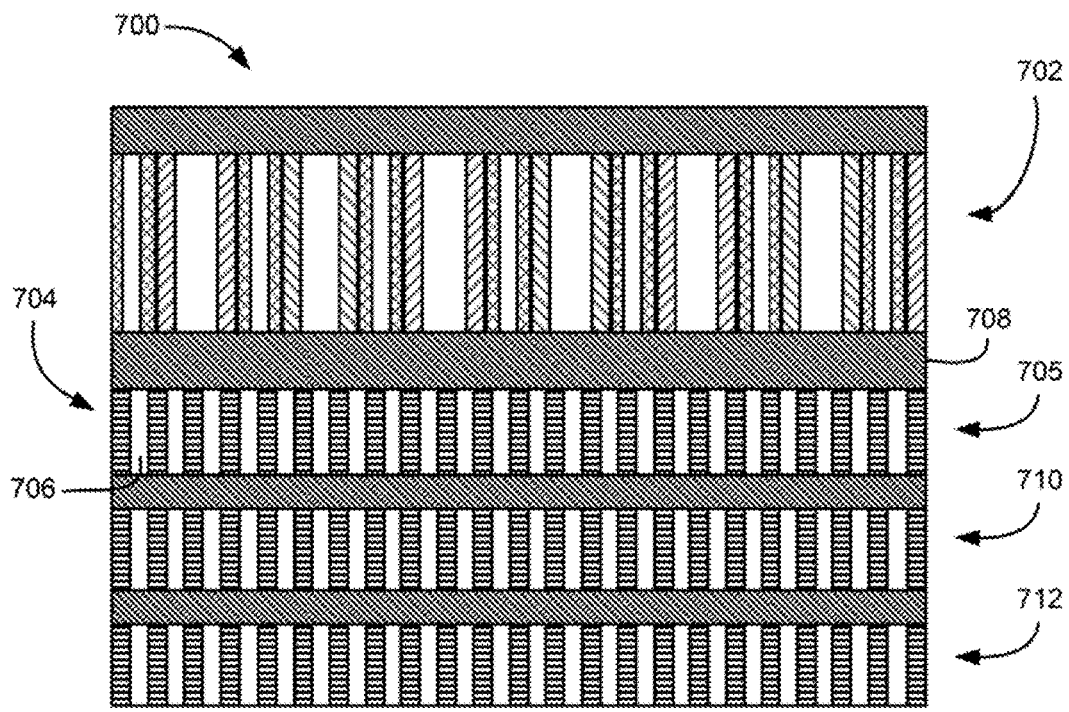
FIG. 7 is a cross sectional view of a fuel cell coupled to a system component according to one embodiment.

FIG. 7 illustrates yet another embodiment 700 in which the high power density three dimensional fuel cell architecture 702 can be optionally integrated with another system component 704 or components. In the example shown, a heat exchanger 705 having heat exchange flow channels 706 are provided to cool or heat the fuel cell substrate 708, a microchannel fuel processor 710 to convert hydrocarbon fuels to hydrogen rich fuel feeds, and a heater, e.g., burner/combustor 712 to maintain the fuel cell and fuel processor temperatures. Such embodiments in a system configuration may incorporate micro-pumps, micro valves, flow controllers, thermal feedback controllers, rechargeable batteries or ultracapacitors, fuel tank, air/oxidant blowers, and/or subsequent fuel storage cartridges in order to realize a completely integrated, compact, high power density fuel cell power source. Additional implementations incorporating any of the described components and/or other components and operations may be suitable for scaled up energy and power generations for stationary and automotive applications.

In use, the fuel cells may be used as portable or fixed power sources for any desired application. Illustrative uses include mobile power sources for military operations, automotive applications, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A fuel cell, comprising:
a porous electrolyte support structure defining an array of microchannels, the microchannels including fuel and oxidant microchannels;
fuel electrodes formed along at least some of the microchannels;
oxidant electrodes formed along other of the microchannels;
a base coupled to the porous electrolyte structure, the base comprising a plurality of base gaps; and
a plurality of walls, each wall having an internal surface and an outer surface,
wherein the outer surfaces of the plurality of walls define the microchannels,
wherein the internal surfaces of the plurality of walls define a plurality of internal gaps, each internal gap being positioned interior to the internal surfaces of the associated wall, and
wherein each base gap provides an independent conduit configured to facilitate direct fluid communication with the porous electrolyte support structure.

2. The fuel cell as recited in claim 1, wherein the porous electrolyte support structure comprises a material selected from a group consisting of silicon, a metal, glass, polymer, ceramic, plastic, epoxy resin, and a metal oxide.

3. The fuel cell as recited in claim 1, wherein the porous electrolyte support structure is structurally characterized as having at least one of molded walls, stamped walls, extruded walls, injected walls, and electrodeposited walls.

4. The fuel cell as recited in claim 1, wherein pores in the porous electrolyte support structure are characterized as having shapes of previously-present nanostructures.

5. The fuel cell as recited in claim 1, wherein the porous electrolyte support structure comprises a block copolymer material composition.

6. The fuel cell as recited in claim 1, wherein the microchannels are elongated and have longitudinal axes that are substantially parallel, wherein each wall separating adjacent microchannels separates an oxidant microchannel and a fuel microchannel.

7. The fuel cell as recited in claim 1, wherein pores of the porous electrolyte support structure are functionalized to render a surface structure of the pores electrolyte-phylic.

8. The fuel cell as recited in claim 1, further comprising an electrolyte in the porous electrolyte support structure, the electrolyte being for operation of the fuel cell at a temperature above 300° C.

9. The fuel cell as recited in claim 8, wherein the electrolyte is selected from a group consisting of a solid oxide, diamond, phosphoric acid doped polybenzamidizole, a composite electrolyte, $NH_4PO_3/(NH_4)_2TiP_4O_{13}$, and $(NH_4)_2SiP_4O_{13}$.

10. The fuel cell as recited in claim 1, further comprising an electrolyte reservoir in fluid communication with the porous electrolyte support structure.

11. The fuel cell as recited in claim 10, wherein the base gaps provide communication between the electrolyte reservoir and the porous electrolyte support structure.

12. The fuel cell as recited in claim 11, wherein the base gaps provide direct fluidic access to an electrolyte supply in the electrolyte reservoir.

13. The fuel cell as recited in claim 1, further comprising an electrolyte in the porous electrolyte support structure, wherein the electrolyte is bound to the porous electrolyte support structure.

14. The fuel cell as recited in claim 1, further comprising carbon nanostructures in and/or around pores of the porous electrolyte support structure.

15. The fuel cell as recited in claim 1, further comprising a reforming catalyst inside the microchannels having the fuel electrodes.

16. The fuel cell as recited in claim 15, wherein the reforming catalyst is selected from a group consisting of platinum, carbon, copper, zinc, and alumina.

17. The fuel cell as recited in claim 1, further comprising metallic nanostructures in and/or around pores of the porous electrolyte support structure.

18. The fuel cell as recited in claim 1, wherein at least one of the electrodes comprises nanostructures having a catalyst coupled thereto.

19. The fuel cell as recited in claim 1, with the proviso that the fuel cell contains no polymeric material.

20. A system, comprising the fuel cell as recited in claim 1, and further comprising a component coupled to the fuel cell, the component being selected from a group consisting of a heat exchanger, a microchannel fuel processor, and a heater.

21. A system, comprising the fuel cell as recited in claim 1, and further comprising a component coupled to the fuel cell, the component being selected from a group consisting of a micro-pump, a micro valves, a flow controller, a thermal feedback controller, a rechargeable battery, an ultracapacitor, a fuel tank, an oxidant blower, and a fuel storage cartridge.

22. The fuel cell as recited in claim 1, wherein portions of the porous electrolyte support structure extend through the base, and
    wherein the portions of the porous electrolyte support structure extending through the base are configured to facilitate replenishment of an electrolyte in the porous electrolyte support structure.

23. The fuel cell as recited in claim 1, wherein portions of the porous electrolyte support structure extend through one or more of the plurality of base gaps, and
    wherein the portions of the porous electrolyte support structure extending through the base gaps are configured to facilitate replenishment of an electrolyte in the porous electrolyte support structure.

24. The fuel cell as recited in claim 1, wherein portions of the porous electrolyte support structure extend through the base and the base gaps, and
    wherein portions of the porous electrolyte support structure extending through the base and the base gaps are configured to facilitate replenishment of an electrolyte in the porous electrolyte support structure.

25. The fuel cell as recited in claim 1, wherein at least a portion of the porous electrolyte support structure extends to a surface of the base.

26. The fuel cell as recited in claim 25, wherein the portion of the porous electrolyte support structure extending to the surface of the base forms a direct fluid communication interface with at least one of the base gaps.

27. A fuel cell system comprising:
    a fuel cell stack comprising a plurality of fuel cells as recited in claim 1;
    a heat exchanger coupled to the fuel cell stack;
    a microchannel fuel processor coupled to the fuel cell stack;
    a heater coupled to the fuel cell stack; and
    one or more additional components coupled to the fuel cell, the additional components being selected from a group consisting of:
    a micro-pump;
    a micro valve;
    a flow controller;
    a thermal feedback controller;
    a rechargeable battery;
    an ultracapacitor;
    a fuel tank;
    an oxidant blower; and
    a fuel storage cartridge.

28. A fuel cell, comprising:
    a porous electrolyte support structure comprising a plurality of walls, each wall having an internal surface and an outer surface,
        wherein the outer surfaces of the plurality of walls define a plurality of micro channels, and
        wherein the internal surfaces of the plurality of walls define a plurality of internal gaps, each internal gap being positioned interior to the internal surfaces of the associated wall, and
    a plurality of fuel electrodes formed along at least some of the microchannels; and
    a plurality of oxidant electrodes formed along other of the microchannels.

29. The fuel cell as recited in claim 28, further comprising a base coupled to the porous electrolyte support structure, the base comprising a plurality of base gaps.

30. The fuel cell as recited in claim 29, further comprising an electrolyte reservoir, the electrolyte reservoir comprising an electrolyte or an electrolyte precursor,
    wherein the electrolyte reservoir is coupled to the base and in fluid communication with the base gaps.

31. The fuel cell as recited in claim 30, wherein the electrolyte reservoir is in fluid communication with the one or more walls via one or more of the internal gaps and the base gaps.

32. The fuel cell as recited in claim 31, wherein the internal gaps are configured to encourage the electrolyte or the electrolyte precursor to fill pores of the walls.

33. The fuel cell as recited in claim 30, wherein the electrolyte reservoir is in fluid communication with the internal gaps via the base gaps.

34. The fuel cell as recited in claim 33, wherein the internal gaps are configured to encourage the electrolyte or the electrolyte precursor to fill pores of the walls.

35. The fuel cell as recited in claim 30, further comprising a mechanism configured to cure the electrolyte precursor.

36. The fuel cell as recited in claim 35, wherein the electrolyte precursor is a liquid, and
    wherein the mechanism for curing the electrolyte precursor is further configured to transform the liquid electrolyte precursor into a solid electrolyte.

37. The fuel cell as recited in claim 28, the porous electrolyte support structure further comprising:
    a plurality of pores; and
    an electrolyte cross-linked to at least some of the pores.

38. The fuel cell as recited in claim 37, wherein pores of the porous electrolyte support structure are functionalized to render a surface structure of the pores electrolyte-phylic.

39. The fuel cell as recited in claim 38, wherein the pores are functionalized to be rendered electrolyte-phylic to a specific electrolyte.

40. The fuel cell as recited in claim 28, further comprising:
    a heat exchanger coupled to the fuel cell;
    a microchannel fuel processor coupled to the fuel cell; and
    a heater coupled to the fuel cell.

41. The fuel cell as recited in claim 28, further comprising one or more additional components coupled to the fuel cell, the additional components being selected from a group consisting of:
    a micro-pump;
    a micro valve;
    a flow controller;
    a thermal feedback controller;
    a rechargeable battery;
    an ultracapacitor;
    a fuel tank;
    an oxidant blower; and
    a fuel storage cartridge.

42. The fuel cell as recited in claim 28, wherein pores of the porous electrolyte support structure are functionalized to render a surface structure of the pores electrolyte-phylic.

43. The fuel cell system as recited in claim 28, wherein the porous electrolyte support structure comprises a material selected from a group consisting of silicon, a metal, glass, polymer, ceramic, plastic, epoxy resin, and a metal oxide.

44. The fuel cell system as recited in claim 28, further comprising carbon nanostructures in and/or around pores of the porous electrolyte support structure.

45. The fuel cell system as recited in claim 28, further comprising a reforming catalyst inside the microchannels having the fuel electrodes,
- wherein the reforming catalyst is selected from a group consisting of platinum, carbon, copper, zinc, and alumina.

46. The fuel cell system as recited in claim 28, further comprising metallic nanostructures in and/or around pores of the porous electrolyte support structure.

47. The fuel cell as recited in claim 28, wherein the internal gaps lie along a common plane.

48. The fuel cell as recited in claim 28, further comprising:
- a base coupled to the porous electrolyte structure and positioned along a bottom side of the fuel cell;
- a capping layer coupled to the porous electrolyte structure and positioned opposite the base, and
- wherein each internal gap spans an entire distance between the base and the capping layer.

* * * * *